Jan. 12, 1960 J. RUDELICK ET AL 2,920,652
CONTROL VALVE
Filed Oct. 29, 1956 6 Sheets-Sheet 6

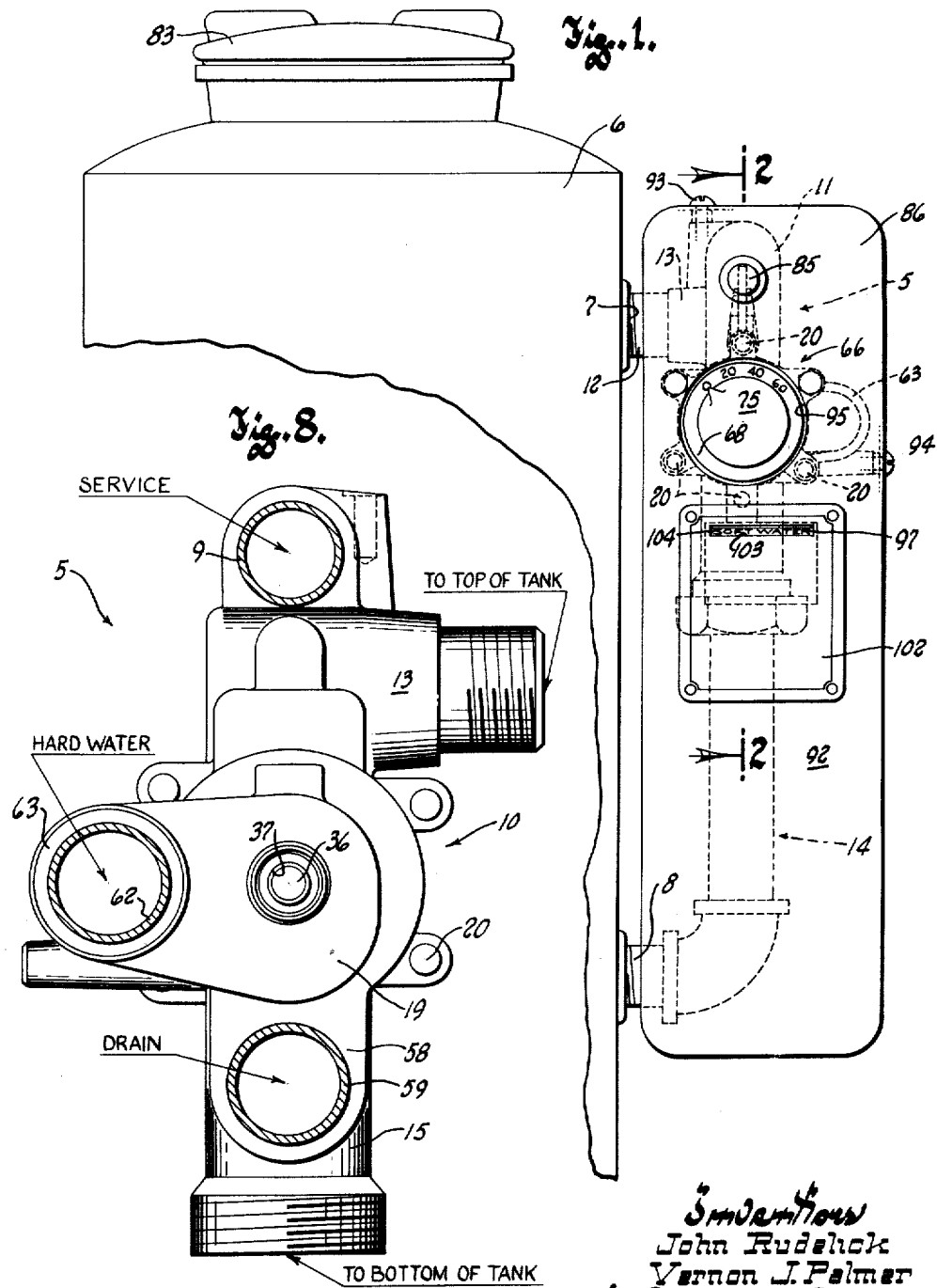

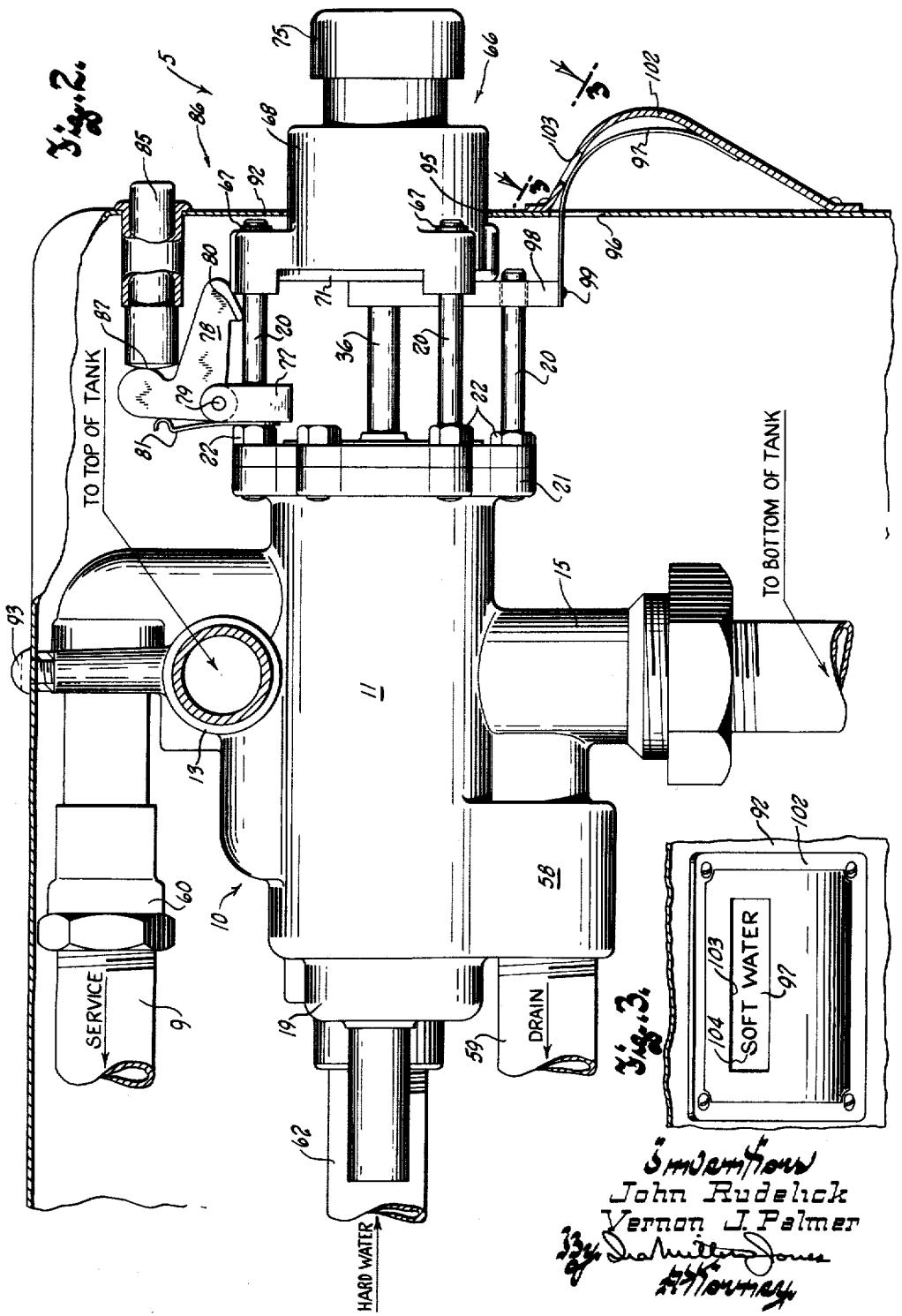

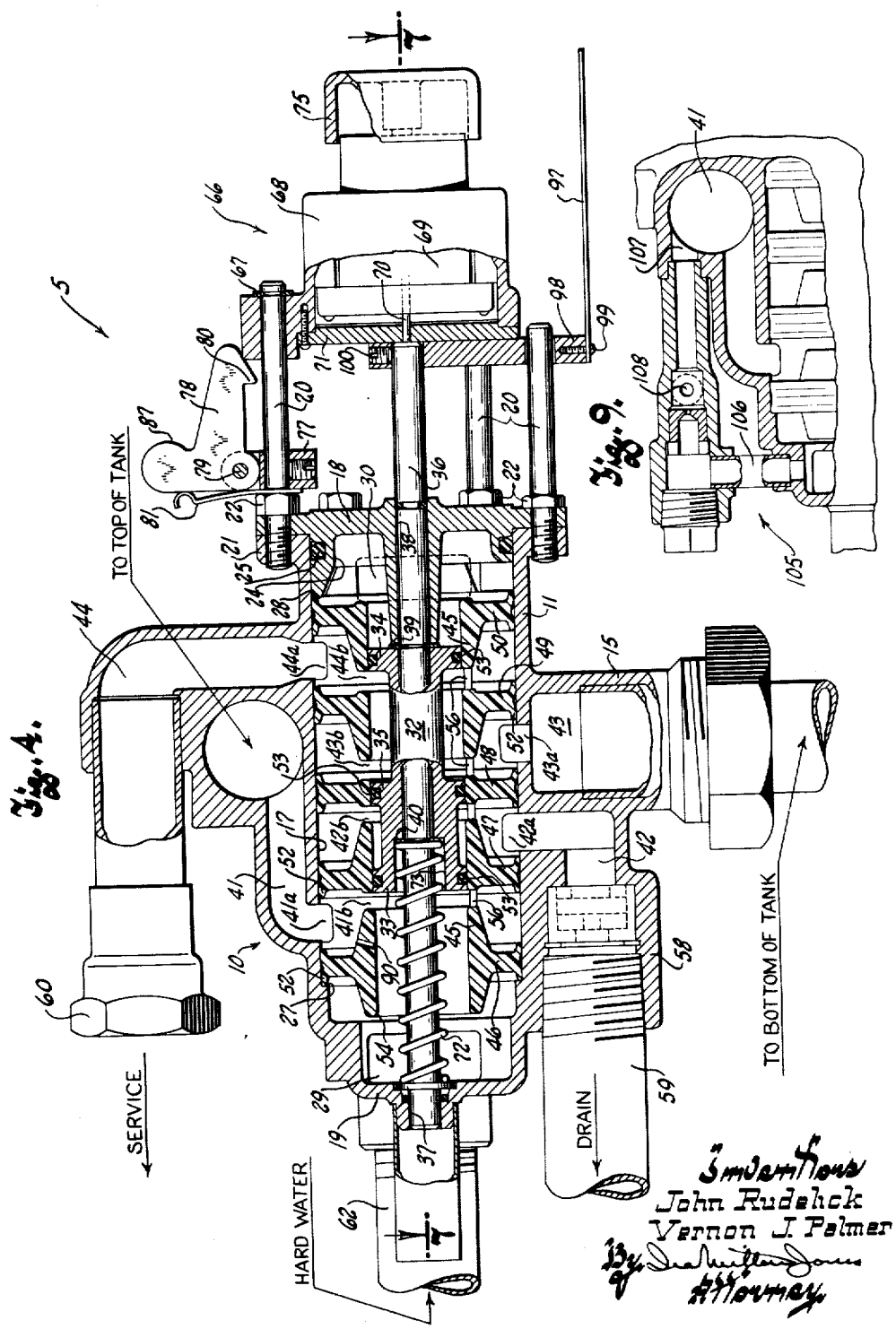

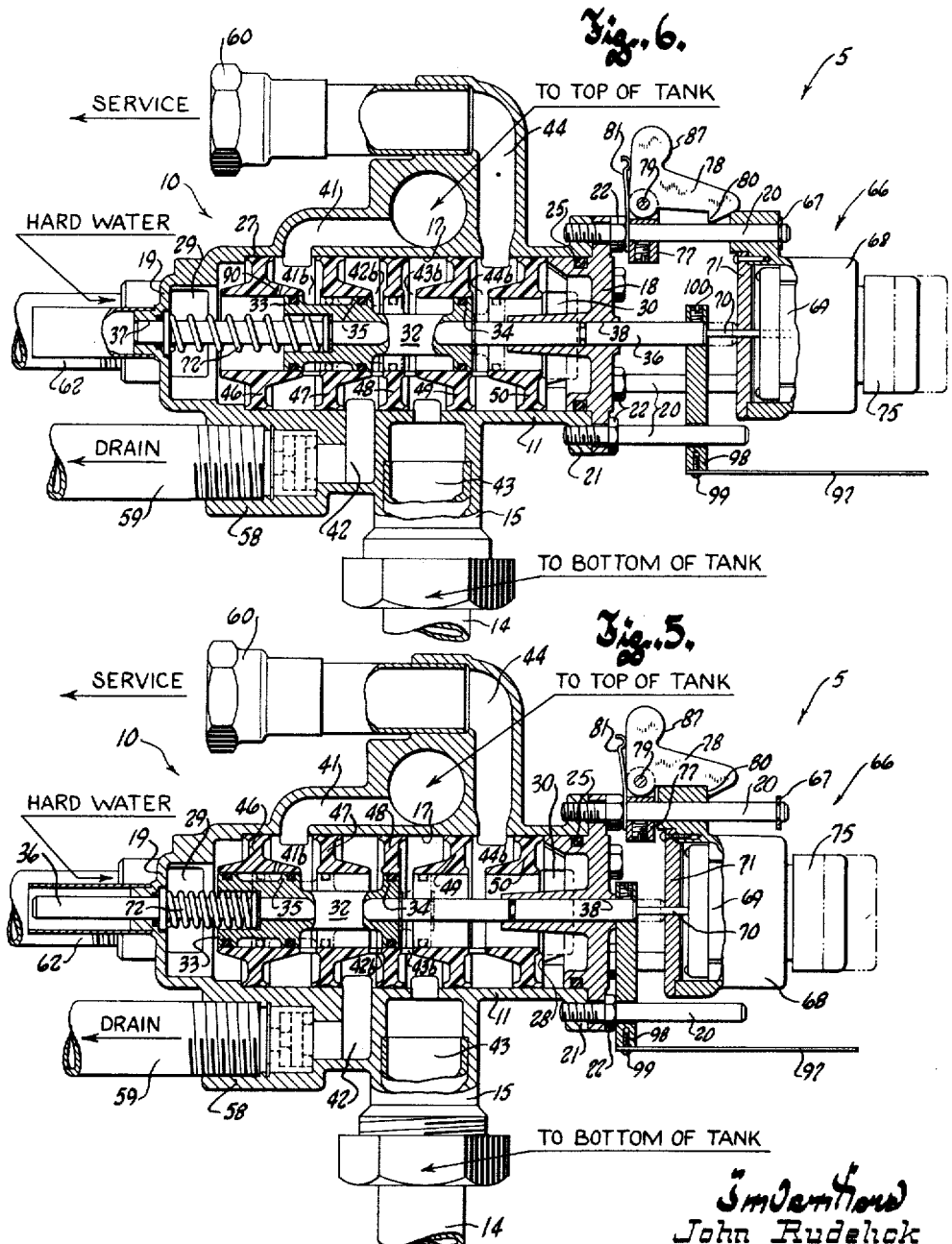

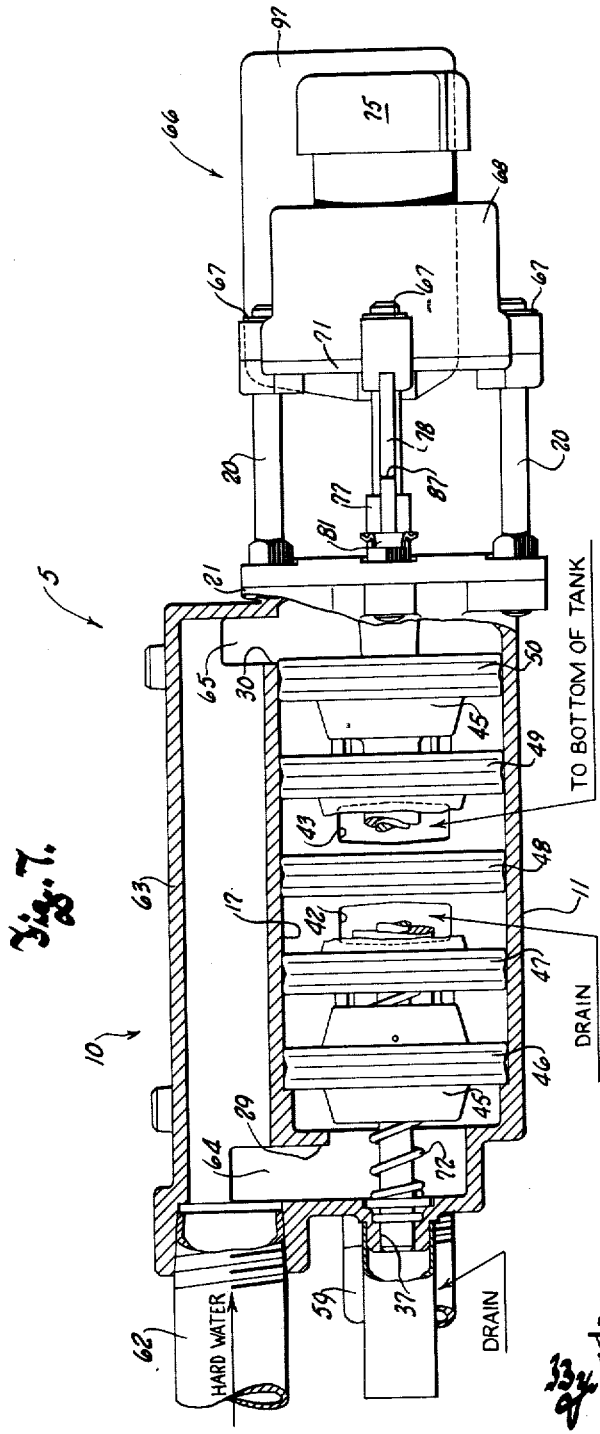

Inventors
John Rudelick
Vernon J. Palmer

United States Patent Office 2,920,652
Patented Jan. 12, 1960

2,920,652

CONTROL VALVE

John Rudelick and Vernon J. Palmer, Milwaukee, Wis., assignors to Bruner Corporation, Milwaukee, Wis., a corporation of Wisconsin Application October 29, 1956, Serial No. 618,788

3 Claims. (Cl. 137—625.29)

This invention relates to control valves of the sliding plunger type, and refers more particularly to improvements in control valves capable of use with many different types of apparatus, but especially intended for use with water softeners and water conditioning or treating apparatus generally.

It is a general object of this invention to provide a control valve of the type having a spool-type plunger shiftable endwise in the body of the valve to several positions to selectively govern the flow of water through the valve, and which features high quality, dependability, low cost, and ease of manufacture and service.

More specifically, it is an object of this invention to provide a control valve of the character described which is so constructed that substantially all internal wear incidental to use of the valve will be confined to surfaces on components of the valve which are easily replaceable, at low service costs, so that the body per se of the valve need not be discarded in the event of faulty operation of the valve due to wear.

In this respect, it is a further object of the invention to provide a control valve of the character described having a hollow valve body, wherein the valve element or plunger slides back and forth in the bored hubs of a number of axially adjacent annular inserts in the hollow interior of the body, and wherein the control ports of the valve which are directly governed by the valve plunger are located at the ends of the insert hubs.

Still another object of this invention resides in the provision of a control valve of the character described with annular inserts in which the valve plunger operates, and wherein those corner surfaces on the end portions of the insert hubs which define the control ports and are traversed by the plunger lands can be readily rounded or chamfered during manufacture of the inserts, so as to enable the plunger lands to be provided with ordinary and inexpensive O-ring seals without danger of the seals becoming damaged or prematurely worn as a consequence of travel of the seals past the control ports. With this improved construction, therefore, the nicely rounded off or chamfered corners at the axial ends of the insert hubs not only prevent damage to the O-ring seals on the plunger but also assure substantially smooth and easy actuation of the plunger with a minimum amount of force.

A further object of this invention resides in the provision of a control valve of the character described wherein the bore of the valve body is partitioned by annular inserts preferably, but not necessarily, formed of a moldable material, which inserts have their peripheries in fluid tight sealing engagement with the interior walls of the body and have hub portions with bores substantially concentric to the body bore to slidably receive the plunger.

Still another object of this invention resides in the provision of a control valve of the character described having an endwise slidable plunger which is capable of a limited degree of radial floating movement so as to assure against binding of the plunger in the bores of the annular inserts during operation of the valve.

In this respect it is a more specific object of the invention to provide a control valve of the character described wherein the plunger is tubular in construction and is shifted endwise back and forth in the coaxial bores of the annular inserts by an operating stem substantially loosely encircled by the plunger and having its end portions slidingly journaled in bearing holes in the opposite end walls of the valve body. The advantage of this improved construction is that is obviates the need for costly and time consuming close-tolerance machining operations during manufacture of the valve, since the plunger is at all times capable of a slight amount of radial self-centering motion relative to the operating stem upon which it is mounted in the event the stem is not exactly coaxial with the bores in the annular inserts.

Another object of this invention resides in the provision of a control valve so constructed as to be particularly well suited for the use with such water conditioning apparatus as water softeners or filters either by manual, automatic, or semi-automatic actuation of the valve plunger, and which features low pressure drop and high flow capacity.

Still another object of this invention resides in the provision of a control valve of the character described wherein the axially slidable plunger of the valve is confined to a range of motion intermediate a pair of pressure balancing chambers in the valve body, each of which is connected with an inlet in the body so that the pressure of fluid entering the inlet may act equally but in opposite directions upon the ends of the valve plunger to balance the same.

A further object of this invention resides in the provision of a control valve of the character described which is adapted to be mounted in a casing having an upright front panel disposed substantially normal to the axis of the valve plunger, and wherein novel means is provided for indicating the axial position of the valve plunger through an opening formed in the front panel of the casing.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

Figure 1 is an elevational view illustrating a portion of a water softener equipped with the control valve of this invention;

Figure 2 is a view partly in side elevation and partly in cross section taken through Figure 1 along the plane of the line 2—2;

Figure 3 is a detail elevational view taken along the plane of line 3—3 in Figure 2;

Figure 4 is a view partly in side elevation and partly in longitudinal section of the control valve of this invention, showing the plunger of the valve in normal operating position;

Figure 5 is a view similar to Figure 4 but showing the plunger of the valve shifted to another operating position and indicating in construction lines a third operating position thereof;

Figure 6 is a view similar to Figure 5 but showing the plunger of the valve in a 4th operating position and indicating in construction lines the normal operating position of the plunger;

Figure 7 is a view partly in longitudinal section and partly in plan taken substantially along the plane of the line 7—7 in Figure 4;

Figure 8 is a view partly in elevation and partly in section viewing the valve of this invention from the end opposite that shown in Figure 1;

Figure 9 is a fragmentary detail view of a portion of the valve shown in Figure 4 but illustrating a slightly modified embodiment of the invention;

Figure 10 is a side elevational view similar to Figure 2 but showing still another embodiment of the invention; and Figure 11 is a fragmentary perspective view of a slightly modified form of insert.

Referring now more particularly to the accompanying drawings, in which like reference characters have been applied to like parts throughout the several views, the numeral 5 generally designates the control valve of this invention and which, though useful for other purposes, is primarily intended to govern the operation of a water softener, for example, the single tank or salt-in-head type of softener shown in Figure 1.

As is well known, such water softeners comprise a tank 6 containing a base exchange material (not shown) which must be regenerated with brine from time to time. Hence, the valve of this invention must not only govern normal operation of the softener by directing hard water into the tank 6 through its inlet 7 and to direct the softened water issuing from the outlet 8 of the tank to a service line 9, but it must also govern regeneration of the base exchange material in the softener tank, which includes such operations as backwashing, brining, and rinsing with fresh water.

The body 10 of the control valve is a casting having a substantially cylindrical main portion 11; and it is preferably, though not necessarily, connected directly to and supported by the softener tank 6 in the manner shown in Figure 1. As therein seen a pipe nipple 12 having its ends threaded into the inlet 7 of the tank and an internally threaded boss 13 on the adjacent side of the valve body cooperates with outlet piping 14 leading from the outlet 8 into the underside of the control valve to support the valve in an upright position directly alongside the upper portion of the softener tank. The outlet piping 14, of course, connects to a downwardly extending tubular part 15 on the underside of the valve body, cast integrally therewith.

Referring first to the construction of the valve as seen best in Figure 4, it will be noted that the cylindrical main portion 11 of the valve body is hollow in that it has an elongated bore 17 which extends lengthwise between the opposite front and rear end walls 18 and 19, respectively, of the valve body. The front end wall 18 is provided by a cover which is detachably held in place on the valve body closing the adjacent end of the bore partly by means of a plurality of cap screws and partly by a number of circumferentially spaced studs 20 (see Figure 1) having their inner end portions passing through holes in the cover and threaded into apertures in a circumferential flange 21 on the valve body. Nut-like enlargements 22 on the studs engage the front of the cover along the rim portion thereof to hold the latter clamped tightly against the flange 21.

The cover 18, of course, provides access to the bore 17 from the front end of the body, and it must be connected to the body in a manner to prevent leakage of fluid therepast. For this purpose the cover is provided with an annular skirt 24 which extends a short distance into the bore 17 and which substantially closely engages the wall thereof. A circumferential groove in the exterior of the skirt accommodates an O-ring seal 25 having pressure engagement with the wall of the bore to guard against the possibility of fluid in the bore leaking past the skirt.

For a purpose to be later described, the valve bore is provided with spaced opposing abutments 27 and 28 near the opposite ends of the body, and the spaces in the hollow interior of the body adjacent to the end walls 18 and 19, outwardly of these abutments provide fluid inlet chambers 29 and 30, respectively. The abutments 28 are provided by three circumferentially spaced lugs projecting rearwardly from the inner end of the skirt 24 on the cover 18.

Slidable lengthwise back and forth in the bore 17 of the cylindrical body portion of the valve is a tubular spool-type valve element or plunger 32 having a pair of lands or flanges 33 and 34 on its opposite end portions and an intermediate land 35, all of the lands being of the same diameter. The plunger loosely encircles and is carried by an elongated operating shaft 36 having its opposite end portions slidingly journaled in bearings provided by holes 37 and 38 in the end walls of the valve body, arranged substantially coaxially with the bore 17. A pair of spring rings 39 and 40, each confined in a circumferential groove in the operating shaft and engaging axially outwardly facing abutments on the plunger constrain the latter to back and forth motion with the operating shaft without interfering with a limited degree of floating motion of the plunger in a radial direction relative to the operating shaft to positions of slight eccentricity with respect thereto.

In accordance with this invention the bore 17 is made substantially larger in diameter than the lands 33, 34, and 35 on the plunger so that the peripheries of the latter are spaced a substantial distance radially from the wall of the bore. Also, the valve body is provided with four control passages 41, 42, 43, and 44 when the valve is to be used with a water softener such as shown, and the respective mouths 41a, 42a, 43a, and 44a of these passages open to the bore 17 at zones spaced along the length of the bore. The mouths of the body passages themselves, however, do not constitute control ports such as are ordinarily directly governed by the plungers of conventional control valves.

In the present invention, the body passages are respectively provided with control ports 41b, 42b, 43b, and 44b, directly governed by the pluger, and which are provided by spaces adjacent to the ends of hubs 45 formed on annular inserts 46, 47, 48, 49, and 50, mounted in the bore 17. These inserts or partitions are so arranged as to constitute transverse partitions between the mouths of the body passages, and they cooperate with one another to define axially adjacent compartments in the bore communicating the mouth of each body passage with its respective control port.

Except for the center insert 48, each of the inserts is provided with an elongated bored hub portion and a flanged peripheral portion 52 which snugly engages the wall of the bore 17 in fluid tight sealing relationship therewith. The center insert 48 has a substantially short hub portion; and it will be noted that the bores in all of the inserts are concentric to the body bore 17, and are of a size to freely slidably receive the lands on the plunger. Fluid tight engagement between the lands and the insert bores is effected by means of O-ring seals 53, one confined in a circumferential groove in each of the lands.

Consequently, depending upon the axial position of the plunger, the O-ring seals govern communication between the adjacent compartments defined by the annular inserts, through the bores of the inserts; and it is a feature of this invention that due to the provision of control ports located at the axial ends of the hubs 45 on the inserts, the circumferential corner portions 54 on the inserts at the junctions of their bores with the end faces of their hubs may be easily rounded or chamfered during manufacture of the inserts, to facilitate traversal of the control ports by the O-ring seals during actuation of the plunger. This is highly important, since it not only assures easy actuation of the plunger with a minimum of effort, but it also eliminates the danger of the seals becoming torn or rapidly worn.

It is also important to note that the endmost inserts 46 and 50 are spaced from and cooperate with the end walls of the body adjacent thereto to define the fluid inlet or pressure balancing chambers 29 and 30, mentioned previously so that when these chambers are connected with a common source of hard water under pressure equal but opposite axial forces will be imposed on the opposite ends of the plunger 32. These pressure balancing or inlet chambers, of course, are communicable with the adjacent control ports and their respective body passages through the bores of the inserts, but such communication, of course, will depend upon the axial position of the plunger in the insert bores.

The inserts are preferably, though not necessarily, formed of a molded plastic such as nylon, and they are confined in the bore 17 of the valve body as a group with the ends of their hub portions substantially equispaced from one another and with the endmost inserts properly spaced from the end walls 18 and 19 of the valve body. For this purpose the peripheral portions of the endmost inserts abut the opposing shoulders 27 and 28 in the bore 17, and certain of the inserts have axially projecting spacer lugs 56 formed on their hub portions to abut the ends of adjacent hubs to hold the inserts substantially equispaced from one another. By way of example, one end of the hub of each of the inserts 46, 47, 49, and 50 may be provided with a series of three circumferentially equispaced lugs projecting axially therefrom to have limited engagement with the ends of the hubs of adjacent inserts; while the center insert 48 may be entirely without such spacer lugs.

As seen in Figure 4, the lugs 56 are preferably spaced along a circle having a diameter slightly larger than the insert bores so as to offer little or no resistance to the travel of the O-ring seals on the plunger lands across the axial spaces between the ends of adjacent insert hubs. The control ports, therefore, may be considered as the spaces between circumferentially adjacent lugs 56.

While it is desirable from the standpoint of low pressure drop to employ only three widely spaced lugs 56 on the insert hubs as described, it may be necessary in some instances to provide a multiplicity of spacer lugs 56' substantially closely spaced around the ends of the hubs as shown in Figure 11. In the latter case, the lugs prevent the O-ring seals from expanding outwardly into the control ports when the valve is used on systems in which the water pressure exceeds about 20 pounds per square inch. In that case also, the lugs 56' act as extensions of the hub bores, since they are not offset outwardly from the bores as in the first described instance. In either case, however, it is important to chamfer or round off the inner corners on the lugs themselves as well as the inner corners on the ends of the hubs adjacent to the bases of the lugs, so as to prevent damage to the O-ring seals and assure easy actuation of the valve plunger.

It is also important to note that the plunger 32, by reason of the loose fit it has on the operating shaft 36, is capable of limited radial floating motion relative to the operating shaft so as to nicely center itself in the insert bores despite a slight degree of eccentricity between the shaft and the insert bores. The manufacture of the valve is materially facilitated with this construction, since it obviates the need for holding to extremely close tolerances in the drilling of the bearing holes 37 and 38 or in the molding of the inserts themselves such as would otherwise be required to maintain exact concentricity of the inserts and the operating shaft with respect to the bore 17. This construction also assures the easiest possible operation of the valve plunger, without danger of the valve element binding during axial sliding thereof to any of its different positions.

As will be apparent from the legends applied to the drawings, the body passage 41 communicates with the internally threaded boss 13 and is thus connected to the inlet 7 of the softener tank. The body passage 42 leads into an internally threaded boss 58 which has a drain pipe 59 threaded thereinto. The body passage 43 is formed in the downward tubular extension 15 on the underside of the valve body and is communicated with the outlet 8 of the softener tank by the outlet piping 14. The body passage 44 extends upwardly and rearwardly in the valve body to a connector 60 for the service line 9 which leads to the various taps at which soft water is to be made available.

The valve body is also provided with an inlet 62 at its rear through which hard water to be softened enters the body. The inlet leads into a manifold 63, see Figure 7, formed on the body at the side thereof remote from the softener tank, and extending lengthwise along the cylindrical main portion of the body. The ends of the manifold are communicated with the inlet chambers 29—30 through lateral branch passages 64 and 65, respectively, in the body near its ends.

With the position of the plunger 32 shown in Figure 4, the valve is set for normal operation of the softener, during which hard water enters the inlet 62 and flows into both inlet chambers 29 and 30 at the opposite ends of the valve body to exert equal but opposite forces on the ends of the plunger. In this normal position of the plunger, the O-ring seals on its three lands are engaged in the inserts 47, 48, and 50 to prevent the flow of hard water through their bores. Only the bores of the remaining inserts 46 and 49 are open at this time, to communicate the inlet chamber 29 with the top-of-tank passage 41, and to communicate the bottom-of-tank passage 43 with the service passage 44. Hence, hard water flows forwardly through the bore of the rearmost insert 46 from the inlet chamber 29 to issue from the annular control port 41b between the inserts 46 and 47, from whence it flows into the mouth of the top-of-tank passage 41 for flow through the softener tank. The outlet piping 14 returns the softened water issuing from the outlet 8 of the tank to the passage 43 of the control valve, from whence it flows through the control port 43b between the inserts 48 and 49 and into the bore of the insert 49 for discharge to the service passage 44 through the control port 44b between inserts 49 and 50.

This normal or softening position of the valve element is defined by the engagement of an actuator for the valve, generally indicated 66, with stops 67 on the forward extremities of each of the three upper studs 20. In the embodiment of the invention disclosed in Figures 1 through 9, the actuator 66 provides for semi-automatic operation of the valve, and for that purpose the actuator comprises a housing 68 having a timing mechanism 69 mounted in its interior. The timing mechanism itself forms no part of the present invention, but it includes a pin 70 projecting rearwardly through and endwise slidably received in a hole in a cover 71 on the rear of the housing 68, with the pin coaxial with and abutting the forward extremity of the operating shaft 36. Also, the operating shaft is at all times yieldingly urged forwardly toward a position at which its front end abuts the rear face of the cover 71 and the rear of the pin 70 projecting therethrough, by means of a coiled compression spring 72 encircling the rear end portion of the shaft and confined between the inner face of the end wall 19, and the bottom of a counterbore 73 in the rear end portion of the valve element 32 into which the spring projects.

The housing of the actuator 66 is mounted on the three upper studs 20 for back and forth sliding motion, toward and from the adjacent front end wall 18 of the valve body, and the compression spring 72 acts thereon through the engagement of the operating shaft with the actuator pin 70 to normally maintain the actuator engaged with its stops 67.

The actuator also carries a knob 75 at the front thereof, the knob being axially fixed with respect to the pin 70 and mounted on the housing 68 for back and forth sliding motion relative to the housing, between defined limits, and for rotation in opposite directions toward and from a predetermined normal position toward which it is biased by spring means, not shown.

The timer may be set by pushing the knob 75 and the pin 70 to their rearward limit of motion, relative to the housing 68, and then rotating the knob clockwise as seen in Figure 1 to any desired position representing a predetermined time interval. During this time interval, the timer mechanism maintains the knob and the pin 70 connected therewith in depressed positions and the knob slowly rotates in the counterclockwise direction toward its normal position. When the knob again reaches its normal position, the timer mechanism releases the knob and the pin 70 connected thereto, and both are propelled to their forward limits of motion by the spring 72 on the operating shaft.

When the timer is set in this manner, its pin 70 advances the operating shaft and valve plunger a distance corresponding to the rearward travel of the knob 75, and the plunger is held against return motion until the expiration of the interval for which the timer has been set. At the conclusion of the timed interval, of course, the compression spring 72 shifts the valve element forwardly to its normal position.

In order to initiate regeneration of the base exchange material in the water softener tank, it is necessary for the operator to press inwardly upon the knob 75 to not only effect projection of the pin 70 from the rear of the actuator housing but to slide the entire actuator assembly rearwardly along the studs 20 to an extreme rear position defined by the engagement of the housing of the actuator with an abutment 77 on one of the studs 20. The actuator is releasably maintained in its fully actuated position by means of a latch lever 78 pivotally mounted on the abutment 77 as at 79 and having a hook portion 80 on its forwardly projecting leg which engages over a forwardly facing surface on the actuator housing under the influence of a biasing spring 81 acting upon the lever. This fully actuated position of the actuator is shown in Figure 5.

It is important to note that when the control valve is provided with a semi-automatic actuator 66 incorporating a timing mechanism of the character described, that the valve plunger must be moved rearwardly manually, and that it is returned automatically. It should also be borne in mind that the operating shaft and hence the valve plunger 32 may be propelled rearwardly by the operator a distance corresponding either to the travel of the actuator housing 68 plus the rearward travel of the knob 75 by which rearward extension of the pin 70 is produced, or equal to the rearward travel of the knob relative to the housing 68.

Referring now to Figure 5, which shows the actuator and the valve element in their rearward limits of travel, it will be noted that the O-ring seals on both rear lands 33 and 35 are engaged in the bore of the rearmost insert 46, while the O-ring seal of the foremost land 34 is engaged in the bore of the center insert 48. Hence, hard water cannot flow out of the inlet chamber 29, and communication between it and the top of tank passage 41 is disrupted. Control ports 41b and 42b, however, are now communicated through the bore of insert 47, and control ports 43b and 44b are both communicated with the forward inlet chamber 30 through the open bores of inserts 49 and 50. Hard water entering the inlet 62 of the valve thus flows from the the inlet chamber 30 through the bores of the two foremost inserts 49 and 50 and control port 43b into the bottom-of-tank passage 43, so that the flow of water through the softener tank is now reversed and a backwashing operation is commenced.

The backwash water issuing from the softener tank is returned to the top-of-tank passage 41 in the valve body and flows to the drain passage 42 through the control ports 41b and 42b and the open bore of insert 47.

Backwashing continues for a period of time determined by the setting of the control knob 75, and during this time hard water is made available to the service line or lines through the service passage 44 which, in this position of the valve plunger, communicates with the forward inlet chamber 30 through the bore of the insert 50 and the control port 44b.

At the conclusion of the timed backwashing interval the knob 75 and its pin 70 are released by the timing mechanism and the compression spring 72 shifts the valve plunger to the right as seen in Figure 5, relative to the actuator housing, to a position defined by the engagement of the front end of the operating shaft with the cover 71 on the actuator housing. This, of course, returns the pin 70 and knob 75 to their normal positions with respect to the actuator housing, but the latter remains latched at its rearward limit of motion. The new position of the parts may be seen in construction lines in Figure 5, where it will be noted that only the bores of the inserts 48 and 50 are open so that hard water may flow to the service passage 44, while a limited quantity of water may discharge from the softener tank through the bottom-of-tank passage 43 to flow to the drain through the bore of the center insert 48. This not only relieves the pressure in the tank, but enables salt to be charged into the top of the softener tank upon removal of its cover 83, it being understood that the softener illustrated is of the single tank or salt-in-head type.

After the operator has placed the required amount of salt in the tank and has replaced the cover 83, it is necessary to effect disengagement of the latch 78 and resetting of the actuator. This is accomplished manually by depression of a release button 85 carried by a casing 86 in which the control valve is mounted. The inner end of the button bears against a forwardly facing surface 87 on the upstanding leg of the latch lever, and when depressed, the button swings the latch lever to release its hooked end from the actuator housing, whereupon the compression spring 72 returns the plunger 32, its operating shaft 36, and the entire actuator 66 to their forward limits of motion seen in Figure 4.

The operator thereafter again depresses the knob 75 to shift the valve plunger to its position seen in Figure 6 at which the actual regeneration operation takes place. Such shifting of the plunger, however, is now effected by depressing only the knob 75 of the actuator, relative to the housing 68 of the actuator, to cause the pin 70 connected with the knob to be projected its predetermined distance from the rear of the housing. The operator, of course, also turns the knob after it has been depressed to set the time interval during which brining and flushing with clear water after all of the salt has been washed through the base exchange material is to obtain.

After the salt charged into the top of the conditioner tank has been dissolved and flushed through the base exchange material, and following a period during which clear fresh water thereafter flows through the base exchange material to rinse the same, the actuator knob 75 and the pin 70 connected therewith are released and the compression spring 72 returns the same along with the valve plunger to their normal positions seen in Figure 4 and indicated in construction lines in Figure 6, in which normal operation of the softener is resumed.

In the brining or slow rinse position of the plunger seen in solid lines in Figure 6, it will be noted that the O-ring seal on the rearmost land 33 of the plunger is engaged in the forward end portion of the bore of insert 46, ahead of a substantially small diameter drilled passage 90 in the hub of the insert through which hard water entering the inlet chamber 29 may flow at a slow, metered rate into the top-of-tank passage 41. The seals on the other two plunger lands are engaged in the bores of inserts 47 and 49 so that the brine which discharges from the outlet 8 of the tank may enter the valve body through the body passage 43 and be directed to the drain passage 42 through the communicating control ports 42b and 43b. Again in this position of the valve element or plunger, the control port 44b is communicated with the inlet chamber 30 so as to render fresh hard water available to the service line or lines.

The casing 86 may be supported on the valve body as by means of screws 93 and 94, and it has a substantially flat upright front panel 92 disposed ahead of the valve body in a position substantially normal to the axis of the plunger 32 and its operating shaft. It is a highly important feature of this invention that the axial or functional position of the valve plunger may be at any time readily ascertained by the operator from a location ahead of the front panel 92 of the casing. The panel 92 has a substantially large round hole 95 formed therein to freely receive the housing 68 of the actuator, and in the normal softening position of the control valve, the actuator projects a substantial distance forwardly beyond the plane of the panel 92 so as to make the knob 75 readily accessible to an operator of the valve.

The panel 92 is also provided with a horizontally elongated opening 96 in a portion thereof which is slightly beneath the hole 95, and the front portion of a flexible indicating element 97 carried by the operating shaft 36 projects forwardly through this opening. The indicator is preferably, though not necessarily, provided by a thin normally flat resilient leaf of plastic material having its rear portion fixed to the lower end of an arm 98 by screws 99, in such a manner that the indicator tends to occupy a horizontal position such as seen in Figure 4, projecting forwardly from the arm. The arm 98 has a hole in its upper portion to receive the forward extremity of the operating shaft to which it is secured by a set screw 100, and it has another hole in its lower portion to slidably receive the lowermost stud 20. Hence, the arm travels back and forth with the operating shaft, carrying the indicator with it, and it is guided for such back and forth motion by its sliding engagement with the lower stud 20.

The forward end portion of the indicator, which projects beyond the panel 92, is held flexed downwardly along the inner surface of a cover 102 secured to the front face of the panel, and having an aperture 103 therein providing a window through which indicia 104 on the upper face of the indicator may be observed. In the normal position of the plunger seen in Figures 2, 3, and 4 the legend "Soft Water" appears in the window 103 to indicate that the valve plunger is at its forward limit of motion at which hard water entering the control valve is directed only to the inlet of the softener tank and soft water issuing from the tank is made available to the service line.

When the plunger is shifted to its rearmost position seen in solid lines in Figure 5, the legend "Backwashing" delineated on the upper face of the indicator appears in the window 103. Similarly in the salting and slow rinse positions of the valve element legends suitably identifying these operations are visible through the window 103 in the cover on the front of the casing.

It should be understood, of course, that the cover 102 is so shaped and located with respect to the indicator that the upper face of the indicator will bear against the inner portion of the cover directly adjacent to the window opening therein in any position of axial adjustment of the valve element, and that the outer or free end portion of the indicator will merely curl down into the lower portion of the cover during forward travel of the operating shaft or will uncurl during rearward motion of the operating shaft.

With a minimum amount of change the control valve of this invention may be easily adapted for service in connection with water softeners having salt receptacles separate from the tank containing the base exchange material. In the latter case the brine is formed in a brine tank (not shown) and can be educted therefrom for passage through the base exchange material in the conditioner tank by means of an ejector 105 mounted on and connected to the valve body in the manner shown in Figure 9.

The construction of ejectors of the type employed in water softening apparatus is well known and it is sufficient merely to note that the inlet portion of the ejector is communicated by a short length of tubing 106 with the rear inlet chamber 29 in the valve body, while the outlet end portion of the ejector is communicated with the top-of-tank passage 41 through a short drilled branch passage 107 in the rear end portion of the valve body. An eductor port 108 in the side of the ejector, of course, is connectible with the brine supply.

When equipped with an ejector as described, it will be understood that the eduction of brine from the brine tank will take place when the valve element is in its position shown in construction lines in Figure 5, immediately following a backwashing operation of predetermined duration; and that fresh rinse water is slowly passed through the base exchange material following brining, when the valve element has been actuated to its position shown in solid lines in Figure 6. The indicator 97, of course, will in this case also have suitable legends imprinted upon its upper face to designate the different functional positions of the valve element.

The control valve of this invention is also ideally suited for manual operation only, that is, without a return spring or timer as described in the previous embodiment of the invention.

The only changes necessary to convert the control valve for wholly manual operation is the elimination of the coiled compression spring 72 and the timer 66 and associated latch mechanism 78, in the manner shown in Figure 10. As therein seen, the forwardly projecting end portion of the operating shaft 36 merely has an ordinary actuator knob 109 fixed to its extremity, and while the lower stud 20 is retained to guide the indicator arm 98, cap screws are employed instead of the upper studs 20 to hold the cover 18 in place on the front of the valve body. Preferably, some type of releasable holding device is provided to maintain the plunger in each axial position of adjustment, especially to assure against creeping of the plunger in the event of any difference in pressures on its opposite ends as might result from the drawing of hard water during regeneration.

From the foregoing description taken together with the accompanying drawings, it will be readily apparent to those skilled in the art that this invention provides a control valve which readily lends itself to a variety of uses but which is ideally suited for the control of water softening or other water conditioning and treating apparatus.

What is claimed as our invention is:

1. In a fluid flow control valve for water softeners and the like: a valve body having a fluid inlet and having an elongated bore with a series of five axially spaced ports opening radially thereinto, the central port constituting a drain port which connects with a drain passage in the body, the two ports at axially opposite sides of said drain port constituting first and second tank ports respectively connecting with first and second tank passages in the body, one of the end ports constituting a service port which leads to a service passage in the body, and the other end port constituting a restricted alternate port communicating with said first tank passage; passage means having branches communicating the body inlet with the bore at locations spaced axially from each end of the series of ports; and a spool shiftable axially back and forth in said bore and having a number of axially spaced circumferentially enlarged lands thereon which are cooperable with the wall of the bore in different axial positions of the spool to control the flow of inlet fluid through said passages, said lands and ports being so arranged that in a normal operating position the spool closes off communication between the drain and said tank passages but communicates the body inlet with said first tank passage and also communicates the second tank passage with the service passage, that in a first operating position most remote from its normal position the spool communicates the body inlet with said second tank passage and also establishes communication between said first tank passage and the drain passage, that in a second operating position less remote from normal the spool provides mutually exclusive communication between said second tank passage and the drain passage, and that in a third operating position intermediate normal and said second operating position the spool provides mutually exclusive communication between said second tank passage and the drain passage but communicates said first tank passage with the body inlet only through said restricted alternate port.

2. In a fluid flow control valve for water softeners and the like: a valve body having a fluid inlet and having an elongated bore with a series of five axially spaced ports opening radially thereinto, the central port constituting a drain port which connects with a drain passage in the body, the two ports at axially opposite sides of said drain port constituting first and second tank ports respectively connecting with first and second tank passages in the body, one of the end ports constituting a service port which leads to a service passage in the body, and the other end port constituting a restricted alternate port communicating with said first tank passage; passage means having branches communicating the body inlet with the bore at locations spaced axially from each end of the series of ports; and a spool shiftable axially back and forth in said bore and having a number of axially spaced circumferentially enlarged lands thereon which are cooperable with the wall of the bore in different axial positions of the spool to control the flow of inlet fluid through said passages, said lands and ports being so arranged that in a normal operating position the spool closes off communication between the drain and said tank passages but communicates the body inlet with said first tank passage and also communicates the service passage only with the second tank passage, that in a first operating position most remote from its normal position the spool closes off said restricted alternate port and said first tank passage from the body inlet but communicates the body inlet with both said second tank passage and said service passage and also establishes communication between said first tank passage and the drain passage, that in a second operating position less remote from normal the spool closes off said restricted alternate port and said first tank passage from the body inlet but provides mutually exclusive communication between said second tank passage and the drain passage and also communicates the body inlet with said service passage, and that in a third operating position intermediate normal and said second operating position the spool provides communication between the body inlet and the service passage but communicates said body inlet with the first tank passage only through said restricted alternate port and also provides mutually exclusive communication between said second tank passage and the drain passage.

3. In a fluid flow control valve for water softeners and the like: a valve body having a fluid inlet and having an elongated bore with a series of five axially spaced ports opening radially thereinto, the central port constituting a drain port which connects with a drain passage in the body, the two ports axially rearwardly and forwardly adjacent to said drain ports constituting first and second tank ports respectively connecting with the first and second tank passages in the body, the foremost port constituting a service port which leads to a service passage in the body, and the rearmost port constituting a restricted alternate port communicating with said first tank passage; passage means having branches communicating the body inlet with the bore at locations spaced axially from each end of the series of ports; and a spool shiftable axially back and forth in said bore and having three axially spaced circumferentially enlarged lands thereon which are cooperable with the wall of the bore in different axial positions of the spool to control the flow of inlet fluid through said ports and the passages connecting therewith, said lands and ports being so arranged that in a normal operating position of the spool the foremost land thereon lies forwardly of said service port thereby closing off said service port from the adjacent branch of the body inlet, the central land lies intermediate and closes off the second tank port from the drain port and cooperates with said foremost land to provide for mutually exclusive communication between said second tank port and said service port, and the rearmost land lies intermediate and closes off the first tank port from the drain port and also provides for communication between said first tank port and the adjacent branch of the body inlet, that in a first operating position of the spool most remote from normal its foremost land lies intermediate the second tank port and the drain port so that both said service and second tank ports communicate with the adjacent branch of the body inlet but are closed off from said drain port, the central land lies intermediate the restricted alternate port and the first tank port and cooperates with said foremost land to provide mutually exclusive communication between said drain and first tank ports, and the rearmost land lies rearwardly of the restricted alternate port to close it off from the adjacent branch of the body inlet, that in a second operating position of the spool less remote from normal the foremost land lies intermediate and blocks off the second tank port from the service port and communicates the later only with the adjacent branch of the body inlet, the central land lies intermediate and closes off the first tank port from the drain port and also cooperates with said foremost land to provide for mutually exclusive communication between said drain and second tank ports, and the rearmost land lies rearwardly of the restricted alternate port, to block off said restricted and first tank ports from the adjacent branch of the body inlet, and that in a third operating position of the spool intermediate normal and said second operating position the foremost land lies intermediate and blocks off the second tank port from the service port and communicates the latter only with the adjacent branch of the body inlet, the central land lies intermediate and closes off the first tank port from the drain port and also cooperates with said foremost land to provide for mutually exclusive communication between said drain and second tank ports, and the rearmost land lies intermediate the restricted alternate port and the first tank port thereby communicating the adjacent branch of the body inlet only with the restricted alternate port.

References Cited in the file of this patent
UNITED STATES PATENTS

| | | |
|---|---|---|
| 413,714 | Freeman | Oct. 29, 1889 |
| 620,124 | Hassis | Feb. 28, 1899 |
| 711,398 | Hanson | Oct. 14, 1902 |
| 734,285 | Thomann | July 21, 1903 |
| 1,164,600 | Forster | Dec. 14, 1915 |
| 1,511,302 | Schnetzer | Oct. 14, 1924 |
| 1,775,856 | Hauser | Sept. 16, 1930 |
| 2,207,921 | Huxford | July 16, 1940 |
| 2,268,699 | Cotner | Jan. 6, 1942 |
| 2,542,390 | Brown | Feb. 20, 1951 |
| 2,622,616 | Hames | Dec. 23, 1952 |
| 2,630,135 | Johnson | Mar. 3, 1953 |
| 2,658,523 | Johnson | Nov. 10, 1953 |
| 2,699,756 | Miller | Jan. 18, 1955 |
| 2,722,514 | Sloan | Nov. 1, 1955 |